(12) United States Patent
Shen et al.

(10) Patent No.: US 12,507,093 B2
(45) Date of Patent: Dec. 23, 2025

(54) SIM CARD SWITCHING METHOD AND APPARATUS, AND ELECTRONIC DEVICE

(71) Applicant: HUAWEI TECHNOLOGIES CO., LTD., Guangdong (CN)

(72) Inventors: Fusheng Shen, Shanghai (CN); Yuwei Fan, Shanghai (CN); Binjun Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 680 days.

(21) Appl. No.: 17/762,012

(22) PCT Filed: Sep. 18, 2020

(86) PCT No.: PCT/CN2020/116287
§ 371 (c)(1),
(2) Date: Mar. 18, 2022

(87) PCT Pub. No.: WO2021/052482
PCT Pub. Date: Mar. 25, 2021

(65) Prior Publication Data
US 2022/0337992 A1  Oct. 20, 2022

(30) Foreign Application Priority Data

Sep. 19, 2019  (CN) .......................... 201910889166.6

(51) Int. Cl.
*H04W 24/08* (2009.01)
*H04W 8/18* (2009.01)
*H04W 88/06* (2009.01)

(52) U.S. Cl.
CPC ............ *H04W 24/08* (2013.01); *H04W 8/183* (2013.01); *H04W 88/06* (2013.01)

(58) Field of Classification Search
CPC ..... H04W 8/183; H04W 24/08; H04W 88/06; H04W 36/14; H04W 24/02; H04W 48/18;
(Continued)

(56) References Cited

U.S. PATENT DOCUMENTS 10,623,946 B1 *  4/2020  Kumar .................. H04W 76/16
2012/0196571 A1  8/2012  Grkov et al.
(Continued)

FOREIGN PATENT DOCUMENTS

CN  105101164 A  11/2015
CN  105357404 A   2/2016
(Continued)

OTHER PUBLICATIONS

Chen Liang, Virtual SIM cards are not revolutionaries, Communications World, 2015, with the English Translation, 3 pages.
(Continued)

*Primary Examiner* — Ricky Q Ngo
*Assistant Examiner* — David M Kayal

(57) ABSTRACT

An objective of this application is to provide a SIM card switching method and apparatus, and an electronic device, so that the electronic device can quickly and accurately perform SIM card switching. The electronic device comprehensively determines, based on a use status of a radio frequency and a network connection status, whether a SIM card needs to be switched. When the radio frequency is used by a specific service, a network connection is temporarily abnormal. However, this temporarily abnormal network connection does not affect operation experience of a user. In this case, if the SIM card is switched, traffic of the SIM card is wasted, and time consumption during SIM card switching also increases a user operation delay. Consequently, determining whether to switch the SIM card only based on the network connection causes incorrect SIM card switching. In (Continued)

this application, incorrect SIM card switching can be avoided.

13 Claims, 5 Drawing Sheets

(58) Field of Classification Search
CPC . H04W 36/30; H04W 36/302; H04W 36/304; H04W 36/305; H04W 36/00; H04W 72/00; H04W 72/12; H04W 72/1215; H04W 88/02; H04W 8/18
See application file for complete search history.

(56) References Cited

U.S. PATENT DOCUMENTS

| | | | |
|---|---|---|---|
| 2013/0148574 A1 | 6/2013 | Liu et al. | |
| 2014/0080485 A1 | 3/2014 | Park | |
| 2016/0095087 A1* | 3/2016 | Mohseni | H04W 24/08 455/558 |
| 2016/0295550 A1 | 10/2016 | Sharma et al. | |
| 2016/0345229 A1* | 11/2016 | Das | H04W 36/142 |
| 2017/0048773 A1* | 2/2017 | Miao | H04W 48/18 |
| 2017/0280380 A1* | 9/2017 | Gundu | H04B 1/3816 |
| 2018/0124868 A1 | 5/2018 | Gupta et al. | |
| 2018/0191913 A1 | 7/2018 | Zhang et al. | |
| 2021/0014667 A1* | 1/2021 | Lovlekar | H04W 12/72 |

FOREIGN PATENT DOCUMENTS

| | | |
|---|---|---|
| CN | 106658629 A | 5/2017 |
| CN | 107027114 A | 8/2017 |
| CN | 107277880 A | 10/2017 |
| CN | 107466077 A | 12/2017 |
| CN | 107548114 A | 1/2018 |
| CN | 108924817 A | 11/2018 |
| CN | 108966207 A | 12/2018 |
| CN | 109151954 A | 1/2019 |
| CN | 110072263 A | 7/2019 |
| EP | 2605561 A1 | 6/2013 |

OTHER PUBLICATIONS

Peng Lin et al, A Game Formulation of Duopoly Market withCoexistence of SoftSim and Regular Users, Globecom 2012—Wireless Communications Symposium, 6 pages.

* cited by examiner

SIM CARD SWITCHING METHOD AND APPARATUS, AND ELECTRONIC DEVICE

CROSS-REFERENCE TO RELATED APPLICATIONS

This application is a national stage of International Application No. PCT/CN2020/116287, filed on Sep. 18, 2020, which claims priority to Chinese Patent Application No. 201910889166.6, filed ono Sep. 19, 2019. Both of the aforementioned applications are hereby incorporated by reference in their entireties.

TECHNICAL FIELD

The present invention relates to the field of mobile communications, and in particular, to a SIM card switching method and apparatus, and an electronic device.

BACKGROUND

With development and popularization of mobile communications technologies, an electronic device (for example, a mobile phone or a tablet computer) using two or more subscriber identity module (subscriber identity module, SIM) cards is widely applied in the market. In most cases, a plurality of SIM cards may belong to different operators. Because SIM cards of different operators are connected to different base stations, signal strengths of the different SIM cards may accordingly be different. If signal quality of a current SIM card is relatively poor, a delay occurs when a user uses a data service. In this case, the electronic device may switch to another SIM card. In the foregoing case, however, incorrect SIM card switching sometimes occurs to the electronic device. For example, if some high-priority signaling is using a radio frequency, no matter which SIM card is switched to, a delay occurs when the user uses the data service.

SUMMARY

An objective of this application is to provide a SIM card switching method and apparatus, and an electronic device, so that the electronic device can quickly and accurately perform SIM card switching. This not only improves SIM card switching efficiency of the electronic device, but also prevents the electronic device from performing incorrect SIM card switching and repeated SIM card switching.

The objective and another objective are achieved by features in the independent claims. Further implementations are embodied in the dependent claims, the specification, and the accompanying drawings.

According to a first aspect, a method for switching a SIM card to perform a data service is provided. The method may be implemented by an electronic device (for example, a mobile phone), and the electronic device includes two or more SIM cards, a modem, and an application processor. The method may include the following steps: The modem obtains a use status of a radio frequency; the modem determines whether a SIM card that does not currently perform a data service occupies the radio frequency; the modem sends use status information of the radio frequency to the application processor; and the application processor comprehensively determines, with reference to the use status of the radio frequency and a current network connection, whether to switch the SIM card. According to the foregoing technical solutions, the electronic device may prevent a problem of incorrect switching when the SIM card that does not currently perform the data service occupies the radio frequency temporarily, to avoid traffic consumption of the SIM card and an increase in a user operation delay. This not only improves SIM card switching effectiveness, but also improves user experience.

In a possible implementation, the modem may obtain the use status of the radio frequency, may further determine which SIM card is using the radio frequency, may further send the use status information of the radio frequency, may further perform a SIM card switching operation, and may further receive a SIM card switching instruction.

In a possible implementation, the application processor may determine, with reference to the use status of the radio frequency and the current network connection, whether to send a SIM card switching instruction, and may further detect the current network connection.

In another possible implementation, the two or more SIM cards in the electronic device may be automatically switched when the current network connection is poor, so that a SIM card with a good network connection is switched to for the data service.

According to a second aspect, an electronic device (for example, a mobile phone) is provided. The electronic device includes two or more SIM cards, a modem, and an application processor. The modem obtains a use status of a radio frequency; the modem determines whether a SIM card that does not currently perform a data service uses the radio frequency to receive a paging message; the modem sends use status information of the radio frequency to the application processor; and the application processor comprehensively determines, with reference to the use status of the radio frequency, a current network connection, and a message received by the electronic device from a base station, whether to switch the SIM card. According to the foregoing technical solution, the electronic device may prevent a problem of incorrect switching because the SIM card that does not currently perform the data service uses the radio frequency when receiving the paging message, to avoid traffic consumption of the SIM card and repeated switching of the SIM card. This not only improves SIM card switching effectiveness, but also improves user experience.

In a possible implementation, the application processor may determine, with reference to the use status of the radio frequency and the current network connection, whether to send a SIM card switching instruction, may further detect the current network connection, and may further parse the message sent by the base station to the electronic device and determine whether the message is a junk packet.

According to a third aspect, an apparatus for automatically switching a SIM card is provided. The apparatus may include at least one processor and a memory, and the memory is coupled to the processor.

According to a fourth aspect, an electronic device (for example, a mobile phone) for automatically switching a SIM card is further provided. The electronic device has a function of implementing behavior of the electronic device in the method according to the first aspect. The function may be implemented by using hardware, or may be implemented by hardware executing corresponding software. The hardware or the software may include one or more modules corresponding to the foregoing function.

According to a fifth aspect, a computer-readable storage medium is further provided. The computer-readable storage medium stores instructions, and when the instructions are run on a computer (for example, a mobile phone or a tablet computer), the computer is enabled to perform the method according to the first aspect.

It should be understood that descriptions of technical features, technical solutions, beneficial effects, or similar statements in embodiments of this application do not imply that all features and advantages can be implemented in any single embodiment. On the contrary, it may be understood that descriptions of the features or the beneficial effects mean that one or more embodiments include a specific technical feature, technical solution, or beneficial effect. Therefore, in this specification, the descriptions of the technical features, the technical solutions, or the beneficial effects may not be specific to a same embodiment. Further, the technical features, the technical solutions, and the beneficial effects described in the embodiments may be combined in any proper manner. A person skilled in the art may understand that a specific embodiment may be implemented without using one or more specific technical features, technical solutions, or beneficial effects of the specific embodiment. In other embodiments, additional technical features and beneficial effects may also be identified in a specific embodiment that does not reflect all the embodiments.

DESCRIPTION OF EMBODIMENTS

Figure 1:
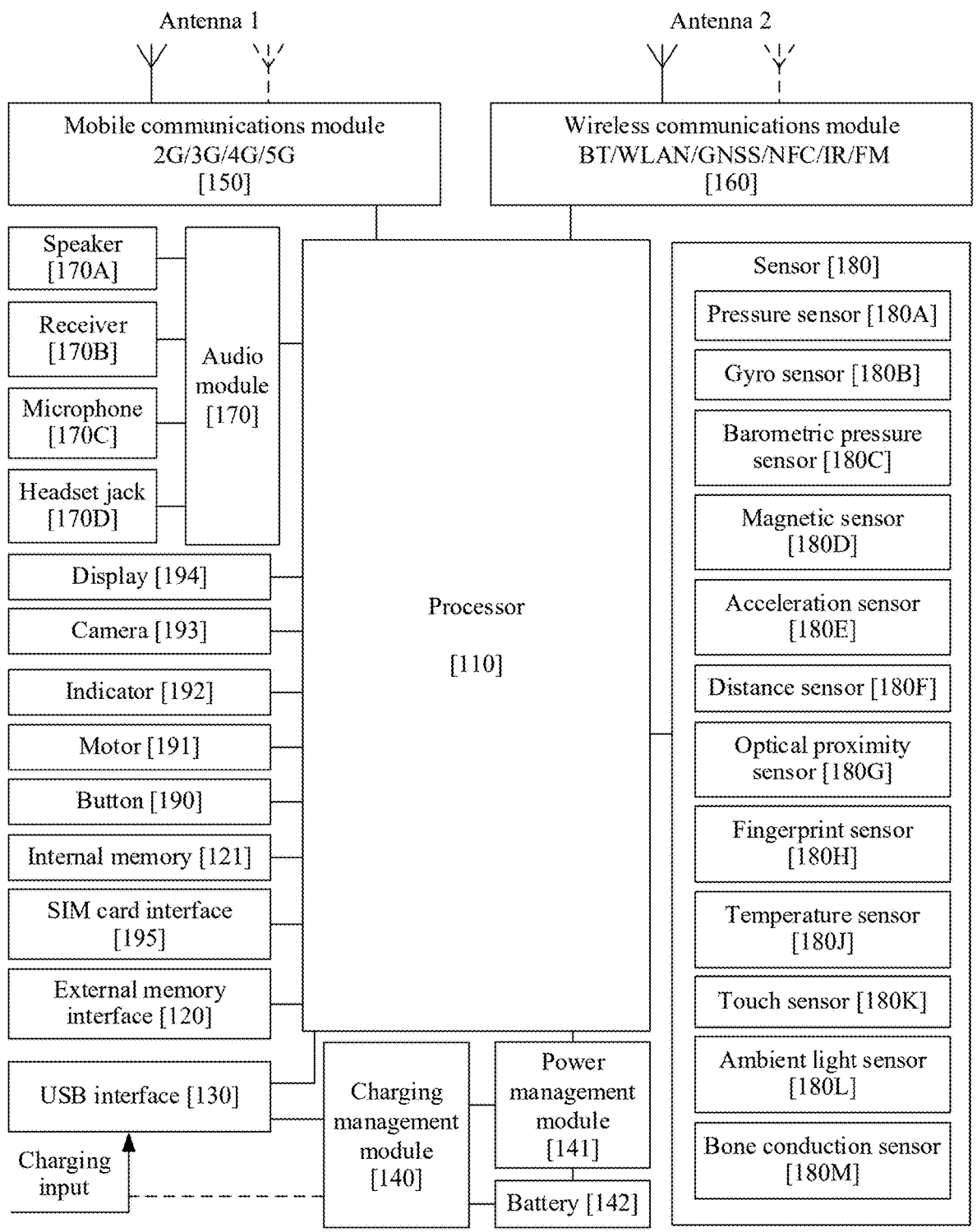
FIG. 1 is a schematic diagram of a structure of an electronic device 101 according to some embodiments of this application.

Terms used in the following embodiments are merely intended to describe particular embodiments, but are not intended to limit this application. As used in the specification and appended claims of this application, words "a", "an", "the", "the foregoing", "this", and "this one" of singular forms are intended to also include plural forms, for example, "one or more", unless otherwise clearly specified in the context. It should be further understood that, in the following embodiments of this application, "at least one" or "one or more" means one, two, or more. The term "and/or" is used to describe an association between associated objects and represents that three relationships may exist. For example, A and/or B may represent the following three cases: Only A exists, both A and B exist, and only B exists, where A and B may be singular or plural. The character "/" usually indicates an "or" relationship between the associated objects.

Reference to "an embodiment", "some embodiments", or the like described in this specification means that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment, instead, the statements mean "one or more but not all of the embodiments", unless otherwise specifically emphasized. The terms "include", "contain", "have", and their variants all mean "include but are not limited to", unless otherwise specifically emphasized.

In the conventional technology, SIM card switching is mainly used for a dual SIM dual standby electronic device. In a SIM card switching scenario, when a network connection of a SIM card is poor, for example, a network signal is weak, a network is interrupted, a signal-to-noise ratio is large, a data round-trip delay is high, or a bit error rate is high, there is a delay when a user performs a data service by using an electronic device, and therefore, the electronic device performs a SIM card switching operation.

However, a method for determining, based on a network connection, whether to perform SIM card switching in the conventional technology has a great disadvantage. In the conventional technology, all parameters that are used to indicate a network connection and that are obtained by an electronic device are based on a transport layer and a network layer. Therefore, these parameters indicating the network connection cannot reflect a specific situation of a physical layer. If the network connection is abnormal due to a change of the physical layer, for example, the network connection is abnormal because a radio frequency is occupied for a short time, it is reflected in that values of these parameters indicating the network connection are inconsistent with preset thresholds. However, in the foregoing scenario in which the radio frequency is occupied for a short time, the radio frequency is used for a very short time, which is usually 0 ms to 100 ms in an actual case. Therefore, this short-time occupation of the radio frequency does not affect use of the electronic device by the user. In the foregoing scenario, if the electronic device performs SIM card switching only based on a parameter change of the network connection, not only traffic consumption of another SIM card is caused, but also time consumption is caused due to SIM card switching, to bring an operation delay for the user.

To resolve the foregoing technical problem, the following embodiments of this application provide a SIM card switching method and apparatus, and an electronic device, which can resolve a problem of incorrect SIM card switching caused by the fact that a radio frequency is occupied for a short time in the conventional technology. This can improve SIM card switching efficiency of the electronic device, and reduce traffic consumption of SIM cards and an operation delay of a user.

An electronic device in the following embodiments of this application supports a plurality of SIM cards including, for example, a first SIM card and a second SIM card. A SIM card that uses a data service by default may be used as the first SIM card, and another SIM card is the second SIM card. It may be understood that the user may also manually switch the SIM card (for example, the first SIM card) using the data service to another SIM card (for example, the second SIM card). The following embodiments of this application may be further applied to a dual SIM dual standby (dual SIM dual standby, DSDS) electronic device. Dual SIM dual standby means: When a second SIM card is installed in an electronic device supporting use of two SIM cards, the electronic device allows a user to perform switching between two independent mobile network services, or the electronic device has hardware support to maintain two connections in a standby state for automatic switching, or the electronic device has a separate transceiver for maintaining two network connections. It should be noted that, in embodiments of this application, relationship terms such as "first" and "second" are used to distinguish one SIM card from another SIM card, but do not limit any actual relationship and sequence between these SIM cards.

The following describes the embodiments of a SIM card switching method and apparatus, and an electronic device in this application. In the following embodiments of this application, the electronic device includes but is not limited to a mobile phone, a tablet computer, a wearable electronic device (for example, a smartwatch or a smart band) having a wireless communication function, an in-vehicle computer, or the like that uses iOS®, Android®, Microsoft®, or another operating system. The electronic device may alternatively be another portable electronic device such as a laptop computer (Laptop). It should also be understood that, in some other embodiments, the electronic device may alternatively be a desktop computer.

For example, the electronic device may be an electronic device 101 in FIG. 1. FIG. 1 is a schematic diagram of a structure of the electronic device 101. The electronic device 101 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identity module (subscriber identity module, SIM) card interface 195, and the like. It may be understood that an example structure in this embodiment does not constitute a specific limitation on the electronic device 101. In some other embodiments, the electronic device 101 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a communication processor (communication processor, CP), a short-distance processor, a voice subsystem, a graphics processing unit (graphics processing unit, GPU), an image signal processor (image signal processor, ISP), a sensor subsystem, and a neural-network processing unit (neural-network processing unit, NPU). The application processor may also be referred to as a main processor on which an operating system (operating system, OS) and an application are run. The communication processor (communication processor, CP) is also referred to as a modem (modem), is configured to execute a communications protocol and driver software, includes a necessary hardware accelerator, and may be further configured to process and parse content of a communication signal, for example, parse, generate, determine, and schedule a message at each protocol layer. The communication hardware accelerator usually performs processing such as signal form/format conversion and conversion and transcoding of another type of signal, and usually does not need to parse and process specific content of the signal. The short-distance processor, namely, a short-distance baseband communication processing unit, may run short-distance communication protocol software and may also include a necessary hardware accelerator. The voice subsystem may perform digital voice signal processing, for example, voice effect enhancement and voice coding, and may include a necessary hardware accelerator. The coding herein may include: voice coding, where a voice signal is further compressed and coded to obtain a signal suitable for communication, for example, an adaptive multi-rate audio compression (adaptive multi-rate compression, AMR), enhanced voice service (enhanced voice service, EVS), and voice signal; and audio coding, where audio is compressed into a coding format suitable for music storage or playback, for example, mp3. The graphics processing unit (graphics processing unit, GPU) performs drawing and rendering calculation on image data to generate an image to be displayed. The graphics processing unit is also referred to as a display core or a visual processor, is a microprocessor that performs an image operation, and may include a 2D and/or 3D processing function. The image signal processor (image signal processor, ISP) is connected to a camera and is configured to capture an image and implement image processing (for example, exposure control, white balance, color calibration, or noise removal) to generate image data. The sensor subsystem mainly includes a processor for processing sensor data, and is configured to collect, classify, identify, and process the sensor data. A sensor may selectively include a touchscreen, a sound sensor, an optical sensor, an accelerometer, a gyroscope, 3D facial recognition, fingerprint recognition, and the like. In some other embodiments, this system may also share a same processor with the voice subsystem. For example, a digital signal processor (digital signal processor, DSP) may be configured to process a sensor signal and a voice signal. The neural-network processing unit (neural-network processing unit, NPU) is an artificial intelligence processor (AI processor), is usually a device that performs convolutional neural network (convolutional neural network, CNN) processing, or may be another type of processor, and may also include a necessary hardware accelerator. This processor may be configured to perform an artificial intelligence operation, for example, perform a large amount of information identification and filtering processing by using a CNN model, or selectively implement some training functions of a CNN model. Different processing units may be independent components, or may be integrated into one or more processors.

In some embodiments, the electronic device 101 may alternatively include one or more processors 110. A controller may generate an operation control signal based on instruction operation code and a time sequence signal, to complete control of instruction fetching and instruction execution. In some other embodiments, a memory may further be disposed in the processor 110, to store instructions and data. For example, the memory in the processor 110 may be a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving data processing or instruction execution efficiency of the electronic device 101.

In some other embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 130 is an interface that complies with a USB standard specification, and may be specifically a mini USB interface, a micro USB interface, a USB Type-C interface, or the like. The USB interface 130 may be configured to connect to a charger to charge the electronic device 101, or may be configured to transmit data between the electronic device 101 and a peripheral device. The USB interface 130 may alternatively be configured to connect to a headset, and play audio by using the headset.

It may be understood that an interface connection relationship between components shown in this embodiment is merely an example for description, and does not constitute a limitation on a structure of the electronic device 101. In some other embodiments, the electronic device 101 may alternatively use an interface connection manner different from that in the foregoing embodiment, or a combination of a plurality of interface connection manners.

A wireless communication function of the electronic device 101 may be implemented through the antenna 1, the antenna 2, the mobile communications module 150, the wireless communications module 160, and the like. In some embodiments, the mobile communications module 150 includes a radio frequency front end (radio frequency front end, RFFE), and mainly includes a radio frequency switch, a duplexer, a filter, a power amplifier, an envelope tracking power supply, antenna tuning, a low noise amplifier, and the like that are required for wireless communication. These components usually are not highly integrated, may be a plurality of independent small chips that are packaged together, and are configured to perform processing such as shaping, passband selection, and gain on a radio frequency (radio frequency, RF) signal detected by an antenna or an RF signal to be sent through an antenna. The antenna 1 and the antenna 2 are configured to transmit and receive electromagnetic wave signals. Each antenna in the electronic device 101 may be configured to cover one or more communication frequency bands. Different antennas may further be multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution, applied to the electronic device 101, for wireless communication including 2G, 3G, 4G, 5G, and the like. The mobile communications module 150 may include one or more filters, a switch, a power amplifier, a low noise amplifier, and the like. The mobile communications module 150 may receive an electromagnetic wave through the antenna 1, perform processing such as filtering and amplification on the received electromagnetic wave, and transmit the electromagnetic wave to the modem for demodulation. The mobile communications module 150 may further amplify a signal modulated by the modem, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (wireless LAN, WLAN), Bluetooth, a global navigation satellite system (global navigation satellite system, GNSS), frequency modulation (frequency modulation, FM), near field communication (near field communication, NFC), an infrared (infrared, IR) technology, or the like and that is applied to the electronic device 101. The wireless communications module 160 may be one or more components integrating one or more communication processor modules. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 101 and the mobile communications module 150 are coupled, and the antenna 2 and the wireless communications module 160 are coupled, so that the electronic device 101 can communicate with a network and another electronic device by using a wireless communications technology. The wireless communications technology may include a GSM, a GPRS, CDMA, WCDMA, TD-SCDMA, LTE, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 101 may implement a display function by using the GPU, the display 194, the AP, and the like. The GPU is a microprocessor for image processing, and is connected to the display 194 and the AP. The GPU is configured to: perform mathematical and geometric calculation, and render an image. The processor 110 may include one or more GPUs that execute instructions to generate or change display information. The electronic device 101 may implement a photographing function through the ISP, one or more cameras 193, the video codec, the GPU, one or more displays 194, the AP, and the like.

The external memory interface 120 may be configured to connect to an external storage card such as a micro SD card, to extend a storage capability of the electronic device 101. The external memory card communicates with the processor 110 through the external memory interface 120, to implement a data storage function. For example, data files such as music, photos, and videos are stored in the external storage card.

The internal memory 121 may be configured to store one or more computer programs, where the one or more computer programs include instructions. The processor 110 may run the instructions stored in the internal memory 121, so that the electronic device 101 performs the SIM card switching method provided in some embodiments of this application. For example, the internal memory 121 may include a program storage area and a data storage area. The program storage area may store an operating system. The program storage area may further store one or more applications (such as "Gallery" and "Contacts"), and the like. The data storage area may store data (for example, a photo and a contact) created in a process of using the electronic device 101, and the like. In addition, the internal memory 121 may include a high-speed random access memory, or may include a nonvolatile memory, for example, one or more magnetic disk storage devices, a flash memory device, or a universal flash storage (universal flash storage, UFS).

The electronic device 101 may implement an audio function such as music playing and recording through the audio module 170, the speaker 170A, the receiver 170B, the microphone 170C, the headset jack 170D, the AP, and the like.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. The touch sensor 180K may also be referred to as a touch panel or a touch-sensitive surface. The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the AP, to determine a type of a touch event. Visual output related to the touch operation may be provided through the display 194. In some other embodiments, the touch sensor 180K may be alternatively disposed on a surface of the electronic device 101, and is at a location different from that of the display 194.

The SIM card interface 195 is configured to connect to a SIM card. The SIM card may be inserted into the SIM card interface 195 to implement an electrical connection to the electronic device 101, or the SIM card may be detached from the SIM card interface 195 to implement separation from the electronic device 101. The electronic device 101 may support one or more SIM card interfaces. The SIM card interface 195 can support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 may also be compatible with the external storage card. The electronic device 101 interacts with a network by using the SIM card, to implement a call function, a data communication function, and the like. In some other embodiments, the electronic device 101 may also use an eSIM, namely, an embedded SIM card. The eSIM card may be embedded in the electronic device 101 and cannot be separated from the electronic device 101.

Figure 2:
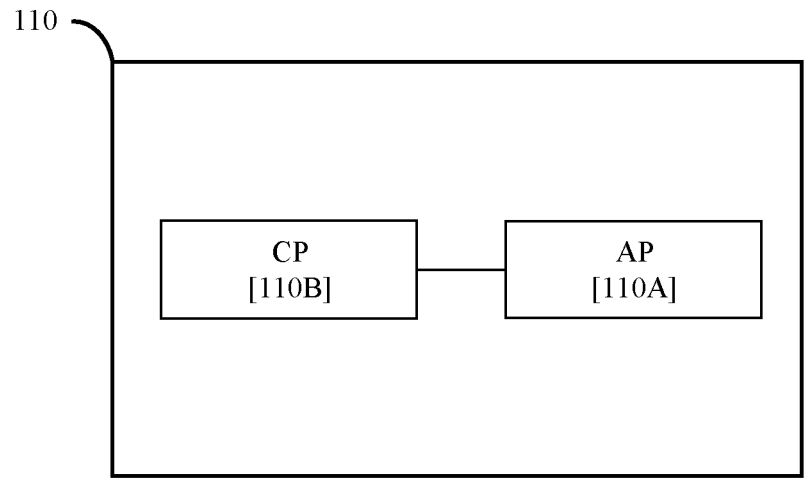
FIG. 2 is a schematic diagram of a structure of components of the processor 110 in FIG. 1.

FIG. 2 is a schematic diagram of a structure of components in the processor 110 in FIG. 1. The processor 110 may include an application processor 110A and a communication processor 110B. These components may communicate with each other through one or more interfaces in the processor 110. The modem 110B can obtain radio frequency occupation information. The radio frequency occupation information may specifically include, but is not limited to, a type of signaling that occupies a radio frequency, a name of a task, and a priority. The radio frequency occupation information may further include a SIM card identifier and the like. The modem 110B may determine, based on the obtained radio frequency occupation information (for example, the SIM card identifier), whether the SIM card (for example, the first SIM card) currently using the data service occupies the radio frequency.

In some embodiments, if the modem 110B determines that the SIM card (for example, the first SIM card) currently using the data service does not occupy a radio frequency resource, the modem 110B may send the radio frequency occupation information to the AP 110A through, for example, a radio interface layer (radio interface layer, RIL) communications interface. This can improve usage efficiency of the modem, and reduce power consumption of the modem.

In some other embodiments, if the modem 110B determines that the SIM card (for example, the first SIM card) currently using the data service does not occupy a radio frequency resource, the modem 110B may determine, based on the obtained radio frequency occupation information, whether specific signaling occupies the radio frequency. This can reduce power consumption of the AP 110A, and release a communication bandwidth between the modem 110B and the AP 110A. The specific signaling may be specifically, but is not limited to, signaling used for a registration service of a cellular network (for example, CDMA), signaling used for an SMS message service, signaling used for a paging service of a second SIM card, or the like.

For example, the signaling that occupies the radio frequency may be shown in Table 1. Table 1 shows several types of signaling that occupies a radio frequency resource, names of tasks, and corresponding priorities, for example, signaling used to register with a 1× network. Priorities of the foregoing tasks are higher than a priority of the data service.

TABLE 1

| Type of signaling | Name of a task | Priority |
| --- | --- | --- |
| [1X RCSCH]Origination | RRM_PS_TASK_TYPE_1X_MO_SMS | 235 |
| [1X RDSCH]Data Burst | RRM_PS_TASK_TYPE_1X_MO_SMS | 235 |
| [1X FDSCH]Data Burst | RRM_PS_TASK_TYPE_1X_MO_SMS | 235 |
| [1X RCSCH]Page Response | RRM_PS_TASK_TYPE_1X_DSCH_MT_SMS | 220 |
| [1X RCSCH]Registration | RRM_PS_TASK_TYPE_1X_REGISTER | 235 |

In some other embodiments, after the modem 110B obtains the radio frequency occupation information, the modem 110B may determine, based on the obtained radio frequency occupation information, whether specific signaling occupies a radio frequency resource. It may be determined whether first signaling is the specific signaling based on whether a priority of the first signaling is higher than a priority of second signaling. The first signaling is signaling in the radio frequency occupation information, and the first signaling occupies a current radio frequency resource. The second signaling is signaling identifying the data service. The specific signaling may be specifically, but is not limited to, signaling used for a registration service of a cellular network (for example, CDMA), signaling used for an SMS message service, signaling used for a paging service of a second SIM card, or the like.

For example, after determining that the specific signaling occupies the radio frequency resource, the modem 110B may send the radio frequency occupation information to the AP 110A through a RIL communications interface.

In some embodiments, the AP 110A may store the radio frequency occupation information after receiving the radio frequency occupation information sent by the modem 110B. The AP 110A determines whether a network connection is normal. The AP 110A may determine whether a network connection is normal by checking whether parameters such as a data round-trip delay, a signal strength, a signal-to-noise ratio, and a bit error rate are consistent with preset thresholds. The AP 110A obtains the foregoing parameters in a plurality of manners, including but not limited to the following: The AP 110A actively obtains the foregoing parameters based on a network connection status; or when the user uses the data service, the AP 110A periodically obtains the foregoing parameters.

In some other embodiments, when determining that a network connection is normal, the AP 110A does not send an AT instruction for SIM card switching; or when determining that a network connection is abnormal, the AP 110A determines whether specific signaling occupies a radio frequency resource. If the specific signaling occupies the radio frequency resource, an AT instruction for SIM card switching is not sent; or if no specific signaling occupies the radio frequency resource, an AT instruction for SIM card switching is sent.

In some embodiments, the AP 110A may send a SIM card switching instruction to the modem 110B by using an AT instruction. The modem 110B may further perform SIM card switching according to the AT instruction of the AP 110A.

For example, that the modem 110B performs SIM card switching may be that the modem 110B may delete a route configuration relationship of the first SIM card by using a route command, and add a route configuration relationship of the second SIM card by using the route command. When sending a packet, the electronic device finds a corresponding network interface via a configured route, sends the packet to a transport layer protocol, and then transmits the packet to a nearby base station via a communication processor. When receiving a packet, the electronic device forwards the packet to a network interface by using a configured routing table, and an application reads the packet from the network interface. The electronic device completes the step of SIM card switching by performing adding and deleting operations on a route configuration relationship of a SIM card. The operation that the electronic device adds or deletes a route configuration relationship by using a route command to complete a SIM card switching operation is applicable to an electronic device that uses an operating system based on a Linux kernel. A plurality of SIM card switching manners in the conventional technology are all applicable to embodiments of this application. The SIM card switching manners are not described herein. After the electronic device completes the SIM card switching operation, the user may perform the data service by using a network with better data transmission performance.

It may be understood that, in some other embodiments, after obtaining the radio frequency occupation information, the modem 110B may send the radio frequency occupation information to the AP 110A, and the AP 110A determines, based on the radio frequency occupation information, whether the SIM card (for example, the first SIM card) currently using the data service occupies the radio frequency. That is, after obtaining the radio frequency occupation information, the modem 110B may directly send this information to the AP 110A, the AP 110A performs subsequent processing, and the modem 110B does not need to analyze the radio frequency occupation information (for example, determine whether this information indicates that a SIM card (for example, the first SIM card) currently using the data service occupies the radio frequency). This not only reduces computing resources of the modem, but also releases a bandwidth for communication between the modem 110B and the AP 110A. It may be understood that, in some embodiments, the modem 110B may alternatively periodically obtain the radio frequency occupation information from the mobile communications module 150.

Figure 3:
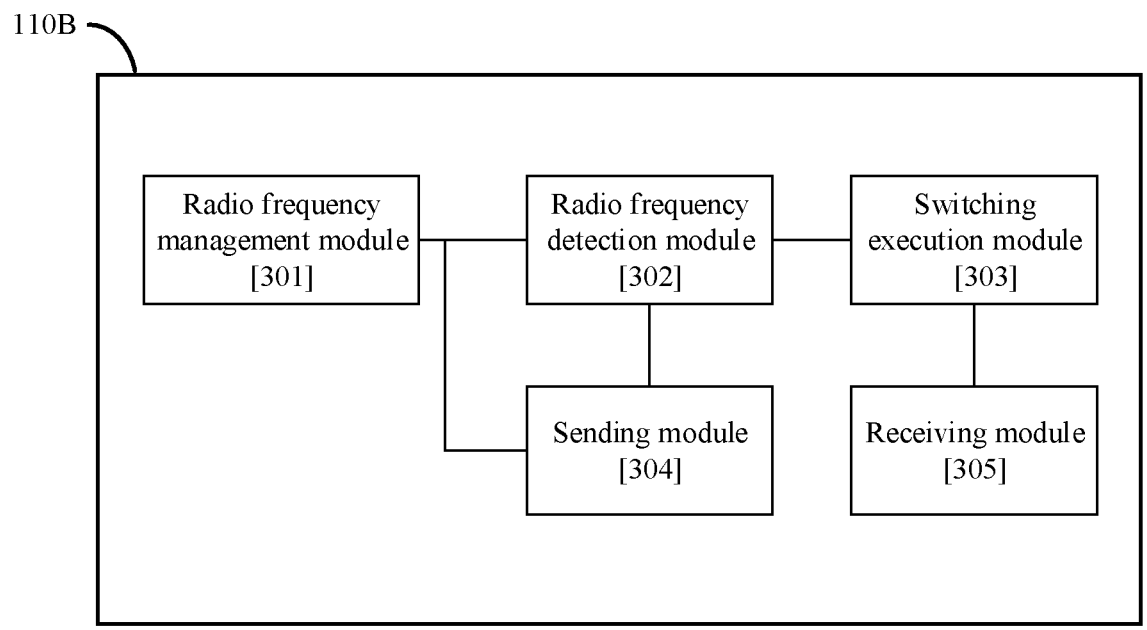
FIG. 3 is a schematic diagram of a structure of a modem 110B according to some embodiments of this application.

With reference to the foregoing embodiments, an embodiment of this application provides a modem, and a schematic diagram of a structure of the modem is shown in FIG. 3. The modem may include a radio frequency management module 301, a radio frequency detection module 302, and a switching execution module 303. The radio frequency management module 301 is configured to obtain the radio frequency occupation information. Meanings of the radio frequency occupation information have been described in the foregoing embodiment, and details are not described herein again. The radio frequency detection module 302 is configured to determine, based on the radio frequency occupation information, whether the SIM card (for example, the first SIM card) currently using the data service occupies the radio frequency resource. The radio frequency detection module 302 is further configured to: when determining that the SIM card (for example, the first SIM card) currently using the data service does not occupy the radio frequency resource, determine whether specific signaling, for example, a 1× registration service, occupies the radio frequency resource. The priority of this specific service is higher than that of the data service. The sending module 304 is configured to: when the radio frequency detection module 302 determines whether the specific signaling occupies the radio frequency resource, send the radio frequency occupation information to the application processor. A receiving module 305 is configured to receive an AT instruction of the AP 110A, and the instruction is used to instruct the modem to execute SIM card switching. The switching execution module 303 is configured to execute SIM card switching according to the AT instruction received by the receiving module 305.

In some embodiments, the radio frequency management module 301 may periodically obtain radio frequency occupation information, and send the radio frequency occupation information to the radio frequency detection module 302 in an inter-process communication (inter-process communication, IPC) manner. The radio frequency detection module 302 determines, based on information (for example, a SIM card identifier) in a received message, whether the SIM card (for example, the first SIM card) currently using the data service occupies the radio frequency resource.

In some other embodiments, the radio frequency management module 301 in the modem 110B can obtain radio frequency occupation information. After obtaining the radio frequency occupation information, the radio frequency management module 301 may send the radio frequency occupation information to the AP 110A, and the AP 110A determines, based on the radio frequency occupation information, whether the SIM card (for example, the first SIM card) currently using the data service occupies the radio frequency. That is, after obtaining the radio frequency occupation information, the radio frequency management module may directly send this information to the AP 110A, the AP 110A performs subsequent processing, and the radio frequency detection module does not need to analyze the radio frequency occupation information (for example, determine whether this information indicates that the SIM card (for example, the first SIM card) currently using the data service occupies the radio frequency). This not only reduces computing resources of the modem, but also releases a bandwidth for communication between the modem 110B and the AP 110A. It may be understood that, in some embodiments, the radio frequency management module 301 may alternatively periodically obtain the radio frequency occupation information from the mobile communications module.

Figure 4:
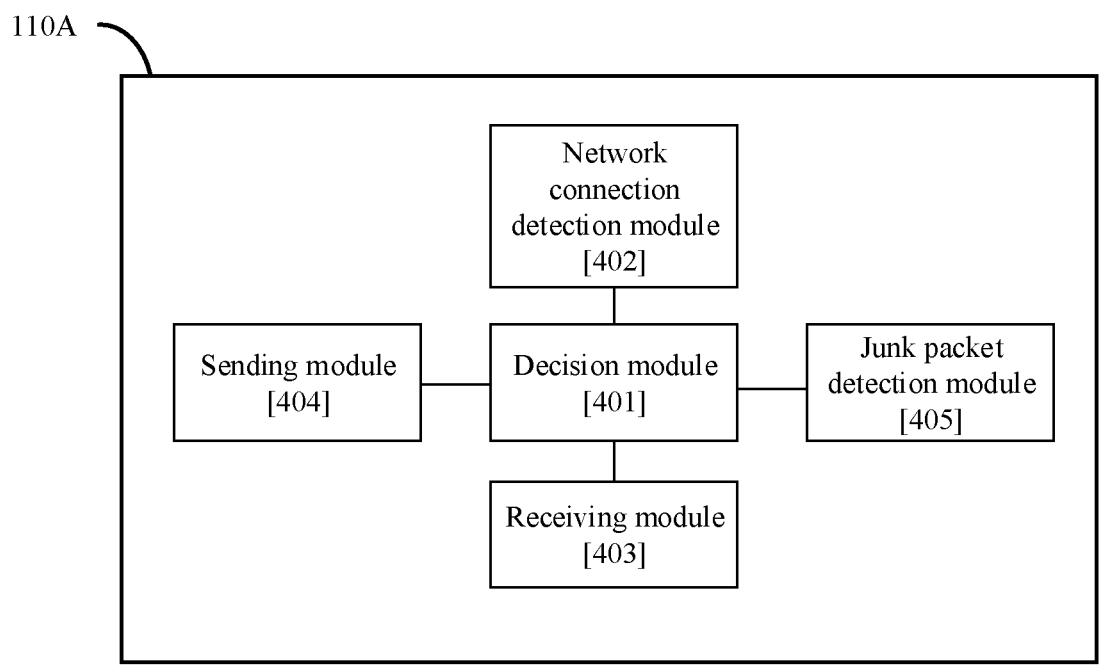
FIG. 4 is a schematic diagram of a structure of an application processor 110A according to some other embodiments of this application.

With reference to the foregoing embodiments, an embodiment of this application provides an application processor, and a schematic diagram of a structure of the application processor is shown in FIG. 4. The application processor may include a decision module 401, a detection module 402, a receiving module 403, and a sending module 404. The detection module 402 is configured to detect quality of a network connection, may indicate the quality of the network connection by using parameters such as a data round-trip delay, a signal strength, a signal-to-noise ratio, and a bit error rate, and may send the foregoing parameters to the decision module 401 in an IPC manner. The decision module 401 is configured to determine, based on the foregoing parameters sent by the detection module 402, whether the network connection is normal.

In some embodiments, the receiving module 403 may be configured to receive the radio frequency occupation information sent by the modem. The sending module 404 may be configured to send the AT instruction for SIM card switching.

In some other embodiments, the AP 110A further includes a junk packet detection module 405, which may analyze a data packet received after a paging message of the second SIM card occupies the radio frequency. If an address of an electronic device in the data packet is inconsistent with an address of the electronic device, the data packet is a junk packet, and the junk packet detection module 405 sends a data packet analysis result to the decision module 401 in an IPC manner; or if an address of an electronic device in the data packet is consistent with an address of the electronic device, the data packet is not a junk packet, and the junk packet detection module 405 continues to analyze the received data packet. The foregoing junk packet is a data packet received by the electronic device from a core network. If an address of the data packet is inconsistent with the address of the electronic device, the data packet is discarded and cannot be forwarded to a network interface of the electronic device. Therefore, this data packet is referred to as a junk packet.

In some embodiments, after receiving a message from the modem 110B, the decision module 401 of the AP 110A may determine, based on information sent by the network connection detection module 402, whether a network connection is normal. If the network connection is normal, the decision module 401 does not send the AT instruction for SIM card switching. If the network connection is abnormal, it is determined, based on information sent by the modem 110B, whether signaling using the radio frequency is specific signaling. If the signaling using the radio frequency is the specific signaling, the decision module 401 does not send the AT instruction for SIM card switching. If the signaling using the radio frequency is not the specific signaling, the decision module 401 sends the AT instruction for SIM card switching to the modem 110B. The switching execution module 303 of the modem 110B performs SIM card switching.

In some other embodiments, after receiving network connection information sent by the network connection detection module 402, the decision module 401 of the AP 110A may also determine whether the network connection is normal. If the network connection is normal, the decision module 401 does not send the AT instruction for SIM card switching. If the network connection is abnormal, the decision module 401 sends the AT instruction for SIM card switching to the modem 110B, and the switching execution module 303 of the modem 110B performs SIM card switching according to the AT instruction.

In some other embodiments, after determining, based on the information sent by the network connection detection module 402, that the network connection is abnormal, the decision module 401 in the AP 110A determines, based on a message sent by the modem 110B, whether a paging message of the second SIM card uses the radio frequency. If the paging message of the second SIM card does not use the radio frequency, the decision module 401 sends the AT instruction for SIM card switching to the modem 110B, and the switching execution module 303 of the modem 110B performs a SIM card switching operation. If the paging message of the second SIM card uses the radio frequency, it is to be determined whether there is a junk packet detection result sent by the junk packet detection module 405. If there is no junk packet in the detection result, the decision module 401 sends the AT instruction for SIM card switching to the modem 110B, and the switching execution module 303 of the modem 110B performs SIM card switching. If there is a junk packet in the detection result, the decision module 401 does not send the AT instruction for SIM card switching.

Figure 5:
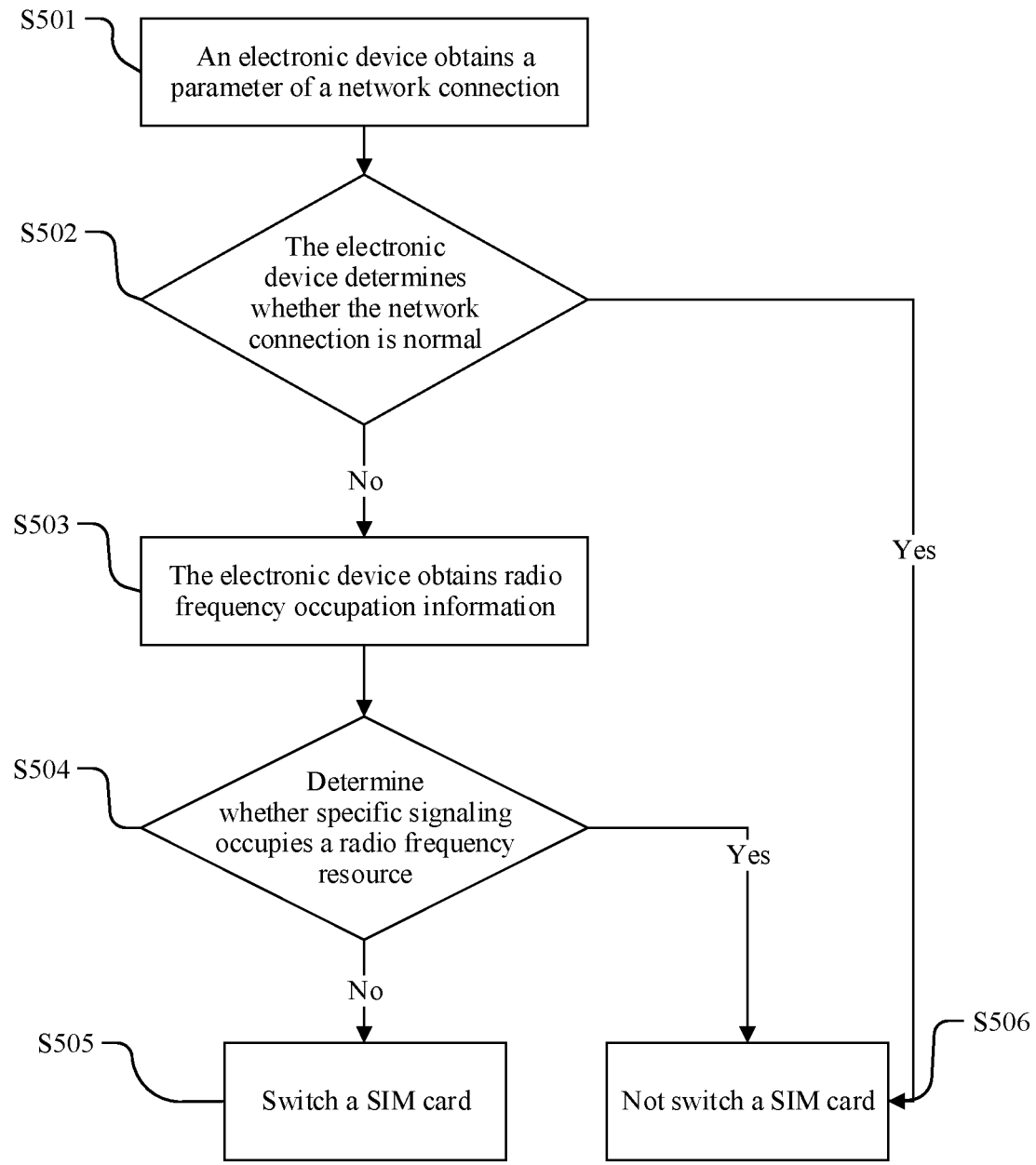
FIG. 5 is a schematic flowchart of a SIM card switching method according to some other embodiments of this application.

As shown in FIG. 5, this application provides a SIM card switching method. The method may be implemented in the foregoing electronic device 101, and the electronic device 101 has a dual card dual standby function. The method may include the following steps.

Step S501: The electronic device obtains a parameter of a network connection.

Step S502: The electronic device determines, based on the obtained parameter of the network connection, whether the network connection is normal. If the network connection is normal, step S506 is performed; or if the network connection is abnormal, step S503 is performed. Cases in which the network connection is abnormal include but are not limited to: When the parameter of the network connection is a signal strength, if a current signal strength is less than a preset signal strength threshold, it is considered that the current network connection is abnormal. When the parameter of the network connection is a signal-to-noise ratio, if a current signal-to-noise ratio is less than a preset signal-to-noise ratio threshold, it is considered that the current network connection is abnormal. When the parameter of the network connection is a data round-trip delay, if a current data round-trip delay is greater than a preset data round-trip delay duration threshold, it is considered that the current network connection is abnormal. When the parameter of the network connection is a bit error rate, if a current bit error rate is greater than a preset bit error rate threshold, it is considered that the current network connection is abnormal. The preset signal strength threshold, the preset signal-to-noise ratio threshold, the preset data round-trip duration threshold, and the preset bit error rate threshold may be determined based on an actual scenario in which the electronic device is located.

Step S503: The electronic device obtains radio frequency occupation information.

Step S504: The electronic device determines, based on the radio frequency occupation information, whether specific signaling occupies a radio frequency resource. If the specific signaling occupies the radio frequency resource, step S506 is performed; or if the specific signaling does not occupy the radio frequency resource, step S505 is performed.

Step S505: The electronic device switches a SIM card.

Step S506: The electronic device does not switch a SIM card.

In some embodiments, after step S503 and before step S504, the method may further include:

Step S503a: The electronic device determines, based on the radio frequency occupation information, whether a SIM card (for example, a first SIM card) currently using a data service occupies a radio frequency resource. If the SIM card (for example, the first SIM card) currently using the data service occupies the radio frequency resource, the electronic device returns to perform step S503, that is, continues to obtain the radio frequency occupation information; or if the SIM card (for example, the first SIM card) currently using the data service does not occupy the radio frequency resource, step S504 is performed.

In some other embodiments, step S501 may be performed after step S503 and before step S504. That is, the electronic device may first obtain the radio frequency occupation information, and then determine whether the SIM card (for example, the first SIM card) currently using the data service occupies the radio frequency resource. If the SIM card (for example, the first SIM card) currently using the data service does not occupy the radio frequency resource, it is further determined whether specific signaling occupies the radio frequency resource.

In some other embodiments, the electronic device may first obtain the radio frequency occupation information, and then determine whether the SIM card (for example, the first SIM card) currently using the data service occupies the radio frequency resource. If the SIM card (for example, the first SIM card) currently using the data service occupies the radio frequency resource, the electronic device continues to obtain the radio frequency occupation information; or if the SIM card (for example, the first SIM card) currently using the data service does not occupy the radio frequency resource, the electronic device further determines whether a paging message of a second SIM card occupies the radio frequency resource. If the paging message of the second SIM card does not occupy the radio frequency resource, the electronic device continues to obtain the radio frequency occupation information; or if the paging message of the second SIM card occupies the radio frequency resource, step S501 is performed. After step S503, the electronic device may further determine whether a junk packet exists. The electronic device analyzes the paging message received by the second SIM card. If an address of the electronic device in a data packet of the paging message is incorrect, the data packet is a junk packet, and step S504 is performed; or if an address of the electronic device in a data packet of the paging message is correct, the data packet is not a junk packet, and the electronic device continues to determine whether a junk packet exists. The junk packet has been described in detail in the foregoing embodiments, and is not described in detail again in this embodiment.

The electronic device comprehensively determines, based on a use status of a radio frequency and the network connection, whether a SIM card needs to be switched. When the radio frequency is used by a specific service, the network connection is temporarily abnormal. However, this temporarily abnormal network connection does not affect operation experience of a user. In this case, if the SIM card is switched according to the conventional technology, traffic of the SIM card is wasted, and time consumption during SIM card switching also increases a user operation delay. Consequently, determining whether to switch the SIM card only based on the network connection in the conventional technology causes incorrect SIM card switching. According to embodiments of this application, incorrect SIM card switching can be avoided, and user experience can be improved.

Figure 6:
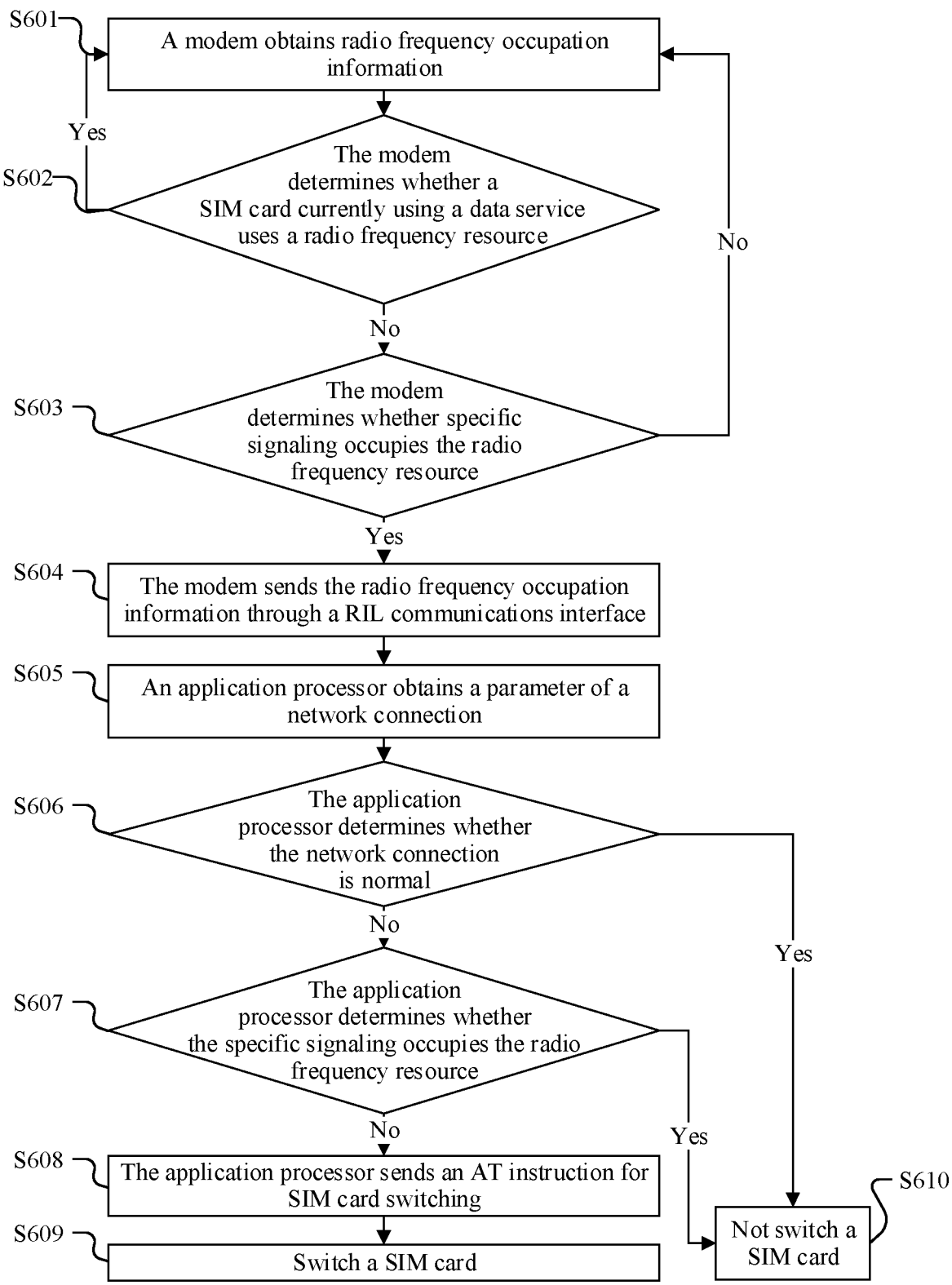
FIG. 6 is a schematic flowchart of a SIM card switching method according to some other embodiments of this application.

As shown in FIG. 6, another embodiment of this application provides a SIM card switching method. The method may be implemented in an electronic device 101 having an AP 110A and a modem 110B. The method includes the following steps.

Step S601: The modem 110B obtains radio frequency occupation information. The radio frequency occupation information includes a type of signaling that occupies a radio frequency, a name of a task, and a corresponding priority.

Step S602: The modem 110B determines whether a SIM card (for example, a first SIM card) currently using a data service occupies a radio frequency resource. If the SIM card (for example, the first SIM card) currently using the data service occupies the radio frequency resource, step S601 is performed; or if the SIM card (for example, the first SIM card) currently using the data service does not occupy the radio frequency resource, step S603 is performed.

Step S603: The modem 110B determines whether specific signaling occupies the radio frequency resource. If no specific signaling occupies the radio frequency resource, step S601 is performed; or if the specific signaling occupies the radio frequency resource, step S604 is performed. The specific signaling has been described in detail in the foregoing embodiments, and is not described in detail again in this embodiment.

Step S604: The modem 110B sends the radio frequency occupation information to the AP 110A through a RIL communications interface.

Step S605: The AP 110A obtains a parameter of a network connection. The parameter of the network connection may be a data round-trip delay, a signal strength, a signal-to-noise ratio, or a bit error rate.

Step S606: After obtaining the parameter of the network connection, the AP 110A determines whether the network connection is normal. If the network connection is normal, step S610 is performed; or if the network connection is abnormal, step S607 is performed. The network connection has been described in detail in the foregoing embodiments, and is not described in detail again in this embodiment.

Step S607: The AP 110A obtains the radio frequency occupation information sent by the modem 110B, and determines whether the specific signaling occupies the radio frequency resource. If the specific signaling occupies the radio frequency resource, step S610 is performed; or if the specific signaling does not occupy the radio frequency resource, step S608 is performed.

Step S608: The AP 110A sends an AT instruction for SIM card switching.

Step S609: The modem 110B receives the AT instruction for SIM card switching sent by the AP 110A, and switches a SIM card according to the AT instruction.

Step S610: The modem 110B does not switch a SIM card.

In some embodiments, in step S607, the AP 110A may further determine whether a paging message of a second SIM card occupies the radio frequency resource. If the paging message of the second SIM card does not occupy the radio frequency resource, step S608 is performed; or if the paging message of the second SIM card occupies the radio frequency resource, step S607a is performed. Step S607a: The AP 110A determines whether a junk packet exists. If it is determined that a junk packet exists, step S610 is performed; or if no junk packet exists, step S607a is performed.

The junk packet has been described in detail in the foregoing embodiments, and is not described in detail again in this embodiment.

In some other embodiments, step S601, step S602, step S603, and step S604 may not be required.

The modem 110B and the AP 110A in the electronic device comprehensively determine, based on a use status of the radio frequency and the network connection, whether the SIM card needs to be switched. When the radio frequency is used by a specific service, the network connection is temporarily abnormal. However, this temporarily abnormal network connection does not affect operation experience of a user. In this case, if the SIM card is switched according to the conventional technology, traffic of the SIM card is wasted, and time consumption during SIM card switching also increases a user operation delay. Consequently, determining whether to switch the SIM card only based on the network connection in the conventional technology causes incorrect SIM card switching. According to embodiments of this application, incorrect SIM card switching can be avoided, and user experience can be improved.

In some embodiments, for a problem of repeated switching of the SIM card, after the electronic device switches the SIM card, the modem may further set a time period within which the SIM card is prohibited from being switched again. The time period in which the SIM card is prohibited from being switched again may be determined according to a requirement of an actual scenario. For example, when the user uses an application that does not have a high requirement on the network connection, the time period may be 5 seconds or 10 seconds. When the user uses an application (for example, an online game) that has a high requirement on the network connection, the foregoing time period may be 30 seconds or 1 minute. Within the foregoing time period, the modem does not perform a SIM card switching operation again. In other words, after the electronic device completes the SIM card switching operation, the modem adds a secure time period for the electronic device, and SIM card switching does not occur within the secure time period. This can effectively reduce repeated SIM card switching.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as "first" and "second" are used to distinguish one entity from another entity, but do not limit any actual relationship and sequence between these entities.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or the functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that a part of this patent application document includes content protected by the copyright. The copyright owner reserves the copyright except copies are made for the patent documents or the recorded content of the patent documents in the Patent Office.

What is claimed is:

1. An electronic device, comprising: a display, one or more processors, and a memory, wherein the memory stores one or more computer programs, the one or more computer programs comprise instructions, and when the instructions are executed by the one or more processors, the electronic device is enabled to perform the following steps:
    obtaining, by the electronic device, a parameter of a network connection of a data service;
    determining, by the electronic device, that the network connection is abnormal, wherein the determination depends on whether the parameter of the network connection meets a preset threshold;
    when the network connection is determined to be abnormal, wherein the determination depends on whether the parameter meets the preset threshold, obtaining, by the electronic device, radio frequency occupation information, wherein the radio frequency occupation information comprises a type of signaling that occupies a radio frequency resource of the abnormal network connection;
    determining, by the electronic device based on the radio frequency occupation information, whether the type of signaling is a specific signaling type; and
    in response to the determination that the network connection is abnormal, at least one of:
        when determining that the specific signaling type does not occupy the radio frequency resource, switching, by the electronic device, a SIM card; and
        when determining that the specific signaling type occupies the radio frequency resource, skipping switching, by the electronic device, a SIM card,
    wherein the specific signaling type is signaling used for a registration service of a cellular network, signaling used for an SMS message service, or signaling used for a paging service of a second SIM card, or the like.

2. The electronic device according to claim 1, wherein the specific signaling type is signaling used for the registration service of the cellular network, signaling used for the SMS message service, or signaling used for the paging service of the second SIM card.

3. The electronic device according to claim 1, wherein the processor comprises a modem and an application processor, and the modem communicates with the application processor through a radio interface layer to transmit the radio frequency occupation information.

4. The electronic device according to claim 1, wherein the parameter of the network connection is a signal strength, a signal-to-noise ratio, a data round-trip delay, or a bit error rate.

5. The electronic device according to claim 1, wherein when the instructions are executed by the one or more processors, the electronic device is enabled to further perform the following steps:
   determining, based on the radio frequency occupation information, whether a first SIM card using the data service occupies the radio frequency resource; and
   when the first SIM card does not occupy the radio frequency resource, determining whether the specific signaling type occupies the radio frequency resource.

6. A SIM card switching method, wherein the method comprises:
   obtaining, by an electronic device, a parameter of a network connection of a data service;
   determining, by the electronic device, that the network connection is abnormal, wherein the determination depends on whether the parameter of the network connection meets a preset threshold;
   when the network connection is determined to be abnormal, wherein the determination depends on whether the parameter meets the preset threshold, obtaining, by the electronic device, radio frequency occupation information, wherein the radio frequency occupation information comprises a type of signaling that occupies a radio frequency resource of the abnormal network connection;
   determining, by the electronic device based on the radio frequency occupation information, whether the type of signaling is a specific signaling type; and
   in response to the determination that the network connection is abnormal, at least one of:
      if the specific signaling type is determined to not occupy the radio frequency resource, switching, by the electronic device, a SIM card; or
      if the specific signaling type is determined to occupy the radio frequency resource, skipping switching, by the electronic device, a SIM card,
   wherein the specific signaling type is signaling used for a registration service of a cellular network, signaling used for an SMS message service, or signaling used for a paging service of a second SIM card, or the like.

7. The method according to claim 6, wherein the specific signaling type is signaling occupied by the registration service of the cellular network, signaling occupied by the SMS message service, or signaling occupied by the paging service of the second SIM card.

8. The method according to claim 6, wherein the method further comprises:
   obtaining, by the electronic device, a second parameter of a second network connection of a second data service;
   determining, by the electronic device, whether the second network connection is normal, wherein the determination depends on whether the second parameter of the second network connection meets a second preset threshold;
   when the second network connection is determined to be normal, the SIM card is not switched.

9. The method according to claim 6, wherein the parameter of the network connection is a signal strength, a signal-to-noise ratio, a data round-trip delay, or a bit error rate.

10. The method according to claim 6, further comprising:
    determining, based on the radio frequency occupation information, whether a first SIM card using the data service occupies the radio frequency resource; and
    when the first SIM card does not occupy the radio frequency resource, determining whether the specific signaling type occupies the radio frequency resource.

11. A SIM card switching method, wherein the method comprises:
    obtaining, by a modem of an electronic device, radio frequency occupation information;
    determining, by the modem based on the radio frequency occupation information, whether a first SIM card for a current data service occupies a radio frequency resource;
    when determining that the first SIM card does not occupy the radio frequency resource, determining, by the modem, whether a specific signaling type occupies the radio frequency resource;
    in response to determining that the specific signaling type occupies the radio frequency resource, sending, by the modem, the radio frequency occupation information to an application processor;
    obtaining, by the application processor, a parameter of a network connection of the data service;
    determining, by the application processor, that the network connection is abnormal based on whether the parameter of the network connection meets a preset threshold;
    when determining that the network connection is abnormal based on whether the parameter meets the preset threshold, determining, by the application processor, whether the specific signaling type occupies the radio frequency resource;
    in response to the determination that the network connection is abnormal, at least one of:
       if the specific signaling type is determined to occupy the radio frequency resource, skipping sending, by the application processor, an AT instruction for SIM card switching to the modem; or
       if the specific signaling type is determined to not occupy the radio frequency resource, sending, by the application processor, an AT instruction for SIM card switching to the modem; and
    switching, by the modem, a SIM card.

12. The method according to claim 11, wherein the modem communicates with the application processor through a radio interface layer to transmit the radio frequency occupation information.

13. The method according to claim 11, wherein the parameter of the network connection is a signal strength, a signal-to-noise ratio, a data round-trip delay, or a bit error rate.

* * * * *